US012547202B2

(12) United States Patent
Seino et al.

(10) Patent No.: US 12,547,202 B2
(45) Date of Patent: Feb. 10, 2026

(54) MULTI-DIRECTIONAL INPUT DEVICE (71) Applicant: Alps Alpine Co., Ltd., Tokyo (JP)

(72) Inventors: Fumitaka Seino, Miyagi-ken (JP); Masatoshi Ono, Miyagi-ken (JP); Toru Nishioka, Tokyo (JP); Kazuhiko Sasaki, Miyagi-ken (JP); Shuji Fujiwara, Miyagi-ken (JP); Taiki Hagihara, Miyagi-ken (JP); Masaaki Mikawa, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/825,434

(22) Filed: Sep. 5, 2024

(65) Prior Publication Data
US 2024/0427365 A1 Dec. 26, 2024

Related U.S. Application Data (63) Continuation of application No. PCT/JP2023/004410, filed on Feb. 9, 2023.

(30) Foreign Application Priority Data
Mar. 8, 2022 (JP) .................... 2022-035034

(51) Int. Cl.
G05G 5/05 (2006.01)
G05G 9/047 (2006.01)

(52) U.S. Cl.
CPC .......... G05G 5/05 (2013.01); G05G 9/047 (2013.01); G05G 2009/04718 (2013.01); G05G 2009/04748 (2013.01)

(58) Field of Classification Search
CPC .......... G05G 2009/04714; G05G 2009/04718; G05G 2009/04722; G05G 2009/04725;
(Continued)

(56) References Cited

U.S. PATENT DOCUMENTS 6,429,767 B1    8/2002  Shimomura
2020/0385956 A1* 12/2020 Krivenkov ............. G05G 9/047
2021/0236919 A1*  8/2021 Endo .................... H01H 25/04

FOREIGN PATENT DOCUMENTS

JP    H11-024777 A    1/1999
JP    2000-305647 A   11/2000
WO   WO-2020105437 A1 *  5/2020 ............. A63F 13/24

* cited by examiner

Primary Examiner — Minnah L Seoh
Assistant Examiner — Gregory T Prather
(74) Attorney, Agent, or Firm — Harness, Dickey & Pierce, P.L.C.

(57) ABSTRACT

A multi-directional input device includes a housing, a control member to be tilted, a first interlock member having a first shaft support portion supported by the housing turnably about a first turn axis and is turned with a tilting operation of the control member, a second interlock member having a second shaft support portion supported by the housing turnably about a second turn axis intersecting the first turn axis and is turned with a tilting operation of the control member, a first urging member to urge the control member to push the first shaft support portion against the housing and provide a return force for returning the control member to a neutral position, a second urging member to urge the second interlock member to push the second shaft support portion against the housing, and a turn detector to detect a turn of each of the first and second interlock members.

14 Claims, 11 Drawing Sheets (58) Field of Classification Search
CPC ......... G05G 2009/04766; G05G 9/047; G05G 5/05; G05G 2009/04748
See application file for complete search history.

MULTI-DIRECTIONAL INPUT DEVICE

CLAIM OF PRIORITY

This application is a Continuation of International Application No. PCT/JP2023/004410 filed on Feb. 9, 2023, which claims benefit of Japanese Patent Application No. 2022-035034 filed on Mar. 8, 2022. The entire contents of each application noted above are hereby incorporated by reference.

BACKGROUND OF THE INVENTION

1. Field of the Invention

The present invention relates to a multi-directional input device having a control member configured to be tilted in a desired direction for input.

2. Description of the Related Art

As an example of multi-directional input devices having a control member such as a control lever configured to be tilted for input, Japanese Unexamined Patent Application Publication No. H11-024777 discloses a multi-directional switch that enables a thin and small multi-directional switch operable with a small control force. This multi-directional switch has a curved surface such that a press contact position of a lower end of the control lever and a movable member moves toward a central axis side of the control lever as the control lever is tilted.

Japanese Unexamined Patent Application Publication No. 2000-305647 discloses a multi-directional input device that includes a control shaft that provides a good manipulation feeling. This multi-directional input device includes the control shaft and an operating member that are spline-connected. When the control shaft is turned in a state in which the control shaft is tilted, the operating member spline-connected to the control shaft also turns even if there is friction between a bottom portion and a bottom plate due to elastic pressing by an urging member. With this structure, the operating member can turn in a rolling manner without slipping on the bottom plate.

The multi-directional input device includes interlock members that interlock with a tilting operation of a control member. The interlock members are turnably mounted in a housing so as to be turned (swung) about a predetermined turn axis with respect to the frame. Accordingly, it is important to reduce a space (rattling) between a shaft support portion of the interlock members and a receiving portion of the housing that receives the shaft support portion to prevent misalignment when the control member returns to a neutral position.

SUMMARY OF THE INVENTION

The present invention has been made in view of the above-described problems, and is directed to provide a multi-directional input device that can achieve a reduced space between a shaft support portion of an interlock member and a receiving portion of a housing that receives the shaft support portion to suppress the occurrence of a detection error when the control member returns to a neutral position.

According to an aspect of the present invention, there is provided a multi-directional input device including a housing, a control member configured to be tilted, a first interlock member having a first shaft support portion supported by the housing turnably about a first turn axis and is turned in conjunction with a tilting operation of the control member, a second interlock member having a second shaft support portion supported by the housing turnably about a second turn axis intersecting the first turn axis and is turned in conjunction with a tilting operation of the control member, a first urging member configured to urge the control member to push the first shaft support portion of the first interlock member against the housing and provide a return force for returning the control member to a neutral position, a second urging member configured to urge the second interlock member to push the second shaft support portion against the housing, and a turn detection section configured to detect a turn of each of the first interlock member and the second interlock member.

With this structure, the second urging member pushes the second shaft support portion against the housing. Accordingly, a space between the second shaft support portion and a portion of the housing that receives the second shaft support portion can be reduced, and an offset in the output of the turn detection section caused by the displacement of the rotation axis of the second shaft support portion from the second turn axis defined by the housing can be suppressed from occurring.

In this multi-directional input device, the second shaft support portion may push a plurality of portions of the housing using the second urging member. With this structure, the second shaft support portion comes into contact with a plurality of portions of the housing, enabling the housing to stably support the second shaft support portion.

In this multi-directional input device, an outer surface of the second shaft support portion may have an arc portion when viewed from a direction along the second turn axis and push the housing at the two portions of the arc portion. With this structure, the two arc portions of the outer surface of the second shaft support portion and the housing are pushed, enabling smooth turn of the second shaft support portion to the housing and stable support of the second shaft support portion by the housing.

In this multi-directional input device, the second urging member may urge the second shaft support portion in a direction along an extending direction of the control member at a neutral position. With this structure, the urging force of the second urging member can contribute to a force of returning the control member to the neutral position.

In this multi-directional input device, the housing may include a regulating member configured to regulate the displacement of the second shaft support portion in a direction having a component opposite to the urging direction of the second urging member. With this structure, while the second urging member is urging the second shaft support portion, the displacement of the second shaft support portion in a direction opposite to the urging direction can be regulated, and the second shaft support portion can be stably supported.

In this multi-directional input device, the control member may move in a direction different from both about the first turn axis and about the second turn axis, and the displacement may be detected by a displacement detection section.

This multi-directional input device may further include an interposing member disposed between the second shaft support portion and the second urging member and in contact with the second shaft support portion to transmit the urging force of the second urging member to the second shaft support portion.

In this multi-directional input device, the second urging member may be in contact with the second shaft support portion at one portion and urge the second shaft support portion. In this multi-directional input device, the second urging member may be in contact with the second shaft support portion at a plurality of portions and urge the second shaft support portion.

In this multi-directional input device, the second urging member may include a V-shaped spring section having a V shape when viewed from a direction along the second turn axis, and the housing may have a spring receiving portion configured to receive the V-shaped spring section. With this structure, the V-shaped spring section can support the second shaft support portion and also urge the second shaft support portion, thereby achieving space saving.

In this multi-directional input device, the second urging member may be supported by the housing and urge a portion other than the second shaft support portion of the second interlock member. This structure can increase the degree of freedom of arrangement of the second urging member.

In this multi-directional input device, the second urging member may have elastically deformable tongue piece portions and the tongue piece portions may urge the second shaft support portion.

In this multi-directional input device, the second urging member may have portions formed by bending a punched plate. This structure can increase the productivity of the second urging member.

In this multi-directional input device, the second urging member may have a torsion spring portion and the portion may urge the second shaft support portion.

DESCRIPTION OF THE PREFERRED EMBODIMENTS

Hereinafter, embodiments of the invention will be described in detail with reference to the attached drawings. In the following descriptions, the same reference numerals are given to the same components and descriptions of the components described once will be omitted as appropriate.

Structure of Multi-Directional Input Device

Figure 1:
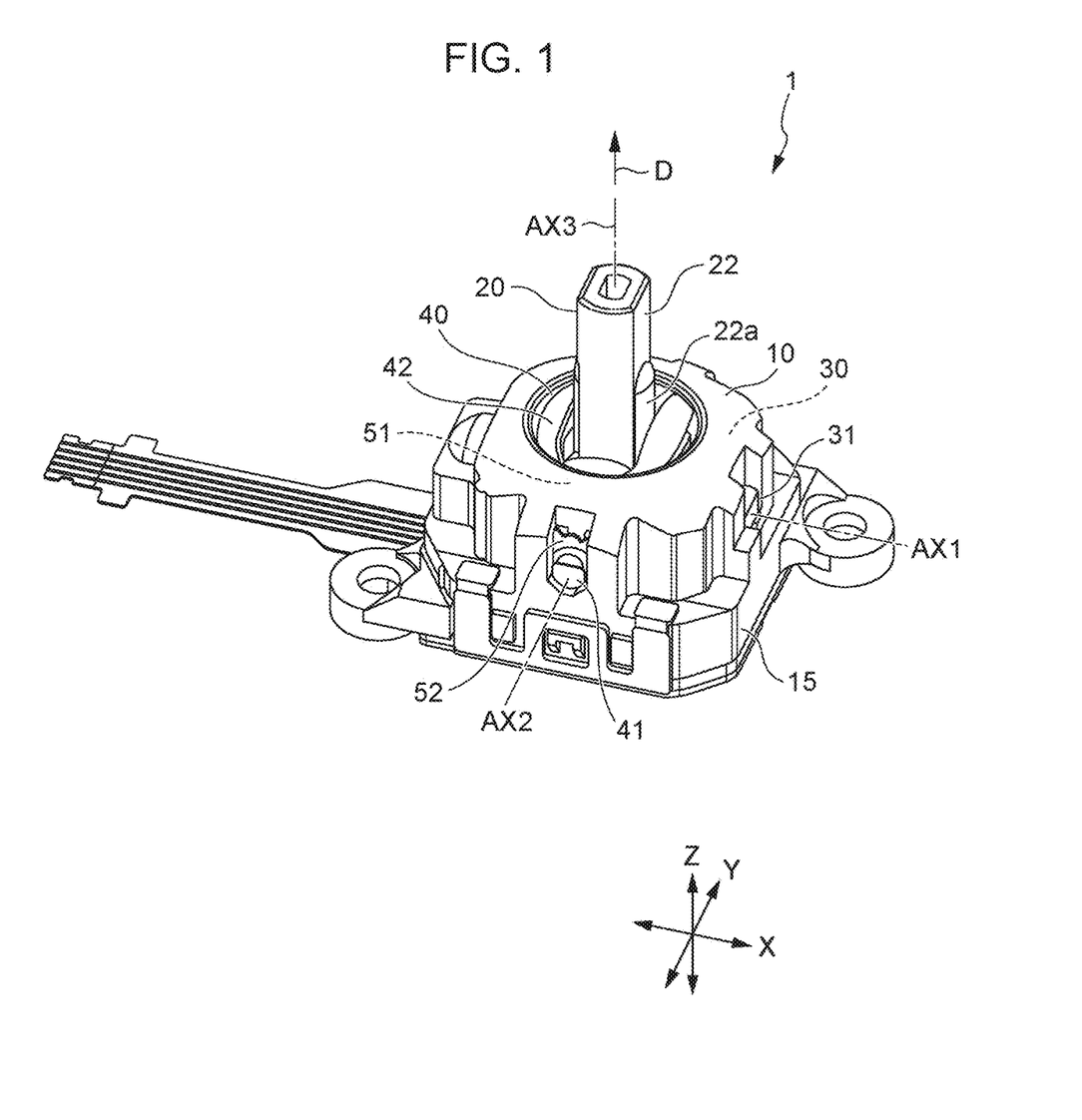
FIG. 1 is a perspective view of a multi-directional input device according to an embodiment.
Figure 2:
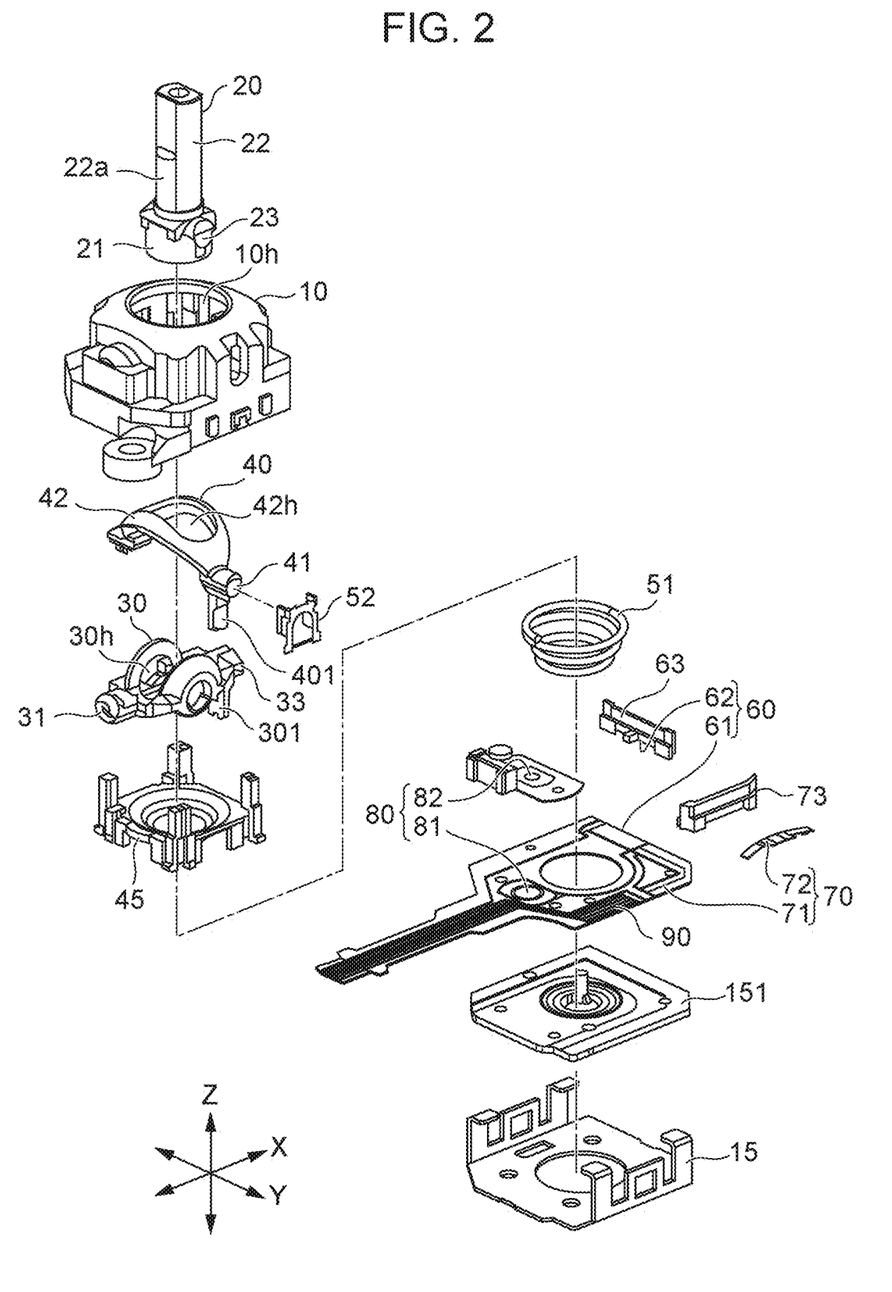
FIG. 2 is an exploded perspective view of a multi-directional input device according to an embodiment.

FIG. 1 is a perspective view of a multi-directional input device according to a first embodiment. FIG. 2 is an exploded perspective view of the multi-directional input device according to the first embodiment. A multi-directional input device 1 according to the first embodiment of the invention is a device configured to receive an input in response to a tilting operation of a control member 20 with respect to a housing 10. Among axes of turn in tilting the control member 20 in the description of the first embodiment, it is defined that a first turn axis AX1 is parallel to the X-axis, a second turn axis AX2 is parallel to the Y-axis, and an axis (neutral axis AX3) at a neutral position of the control member 20 is parallel to the Z-axis. In the Z-axis direction, it is defined that a side toward which the control member 20 at the neutral position extends is referred to as an upper side in the Z-axis direction (up, upward), and the opposite side is referred to as a lower side in the Z-axis direction (down, downward).

The multi-directional input device 1 includes the housing 10, the control member 20, a first interlock member 30, a second interlock member 40, a first urging member 51, a second urging member 52, a first turn detection section 60, and a second turn detection section 70. The housing 10 has a substantially box shape and has an opening at a lower portion. A hole 10$h$ for positioning the control member 20 is provided at an upper central portion of the housing 10. A bottom plate member 15 is provided as a part of the housing 10 at the lower opening portion of the housing 10. The housing 10 may contain, as a non-limiting example, a metallic material such as an iron-based material, an aluminum-based material, or a copper-based material. The bottom plate member 15 may contain a material different from the material contained in the housing 10, for example, a resin-based material such as polyethylene or polypropylene.

The control member 20 includes a cylindrical portion 21 disposed in the housing 10 and an extending portion 22 that extends outward from the inner side of the housing 10 through the hole 10$h$. When the control member 20 is at the neutral position, an extending direction D of the extending portion 22 is parallel to the Z-axis, whereas, when the control member 20 is tilted, the extending direction D of the extending portion 22 is not parallel to the Z-axis. The control member 20 can be tilted about each of the first turn axis AX1 and the second turn axis AX2 with respect to the housing 10.

The first interlock member 30 has a first shaft support portion 31 that is supported by the housing 10 turnably about the first turn axis AX1 and is turned in conjunction with a tilting operation of the control member 20. The first interlock member 30 has a frame shape and has a hole 30$h$ at a center. The control member 20 is inserted through the center hole 30$h$ of the first interlock member 30. A fit protruding portion 23 protrudes from the cylindrical portion 21 of the control member 20. The fit protruding portion 23 slidably fits into a fitting hole 30$a$ provided in the first interlock member 30. The first interlock member 30 may contain, as a non-limiting example, a resin-based material such as polyacetal, polyester, or polyamide.

The second interlock member 40 has a second shaft support portion 41 that is supported by the housing 10 turnably about the second turn axis AX2 and is turned in conjunction with a tilting operation of the control member 20. The second interlock member 40 has an arched arch portion 42. A hole 42$h$ is provided at a center of the arch portion 42 of the second interlock member 40. The extending portion 22 of the control member 20 is inserted through the center hole 42$h$ of the arch portion 42 of the second interlock member 40. The extending portion 22 of the control member 20 has a convex portion 22a. The convex portion 22a comes into contact with the arch portion 42 in a state in which the control member 20 is inserted through the hole 42h of the arch portion 42 such that the extending portion 22 slidably fits into the hole 42h.

The second interlock member 40 is disposed to cover the first interlock member 30 in the Y-axis direction. In a state in which the second interlock member 40 covers the first interlock member 30 and the extending portion 22 of the control member 20 is inserted through the hole 30h of the first interlock member 30 and the hole 42h of the second interlock member 40, these components are incorporated into the housing 10. The second interlock member 40 may contain, as a non-limiting example, a resin-based material such as polyacetal, polyester, or polyamide.

The first urging member 51 urges the control member 20 to push the first shaft support portion 31 of the first interlock member 30 against the housing 10 and provide a return force for returning the control member 20 to the neutral position. The first urging member 51 is, for example, a coil spring. The first urging member 51 urges the control member 20 via a third interlock member 45. The third interlock member 45 is disposed below the control member 20 (closer to the bottom plate member 15 side than the first interlock member 30 is) and is tilted in conjunction with a tilting of the control member 20. The first urging member 51 is incorporated between the third interlock member 45 and a holding plate 151 that is in contact with the bottom plate member 15. With this structure, the first urging member 51 urges the control member 20 in the extending direction D via the third interlock member 45.

When the control member 20 is tilted, the third interlock member 45 is tilted to cause the first urging member 51 on the tilting lower side to be compressed, causing the first urging member 51 on the tilting upper side to be extended. When the tilting operation on the control member 20 is released, the compressed side of the first urging member 51 extends and the extended portion contracts, returning the control member 20 to the neutral position.

The first turn detection section 60 detects a turn of the first interlock member 30, and the second turn detection section 70 detects a turn of the second interlock member 40. The first turn detection section 60 includes, for example, an electrical-resistance sensor 61 and a brush 62. The second turn detection section 70 includes, for example, an electrical-resistance sensor 71 and a brush 72. The electrical-resistance sensors 61 and 71 are formed on a circuit board 90 such as a flexible printed circuit board. The brushes 62 and 72 are attached to a holder 63 and a holder 73 respectively. The brushes 62 and 72 are mounted so as to slide together with the holders 63 and 73 on the electrical-resistance sensors 61 and 71 respectively.

The holder 63 with the brush 62 attached can be slid in conjunction with a swing of a claw portion 301 provided to the first interlock member 30. With this structure, the claw portion 301 is caused to swing by a turn of the first interlock member 30 about the first turn axis AX1 and the swing causes the holder 63 to slide on the electrical-resistance sensor 61. The electrical resistance values change depending on positions of the brush 62 on the electrical-resistance sensor 61, and by using the electrical resistance values, the turn of the first interlock member 30 about the first turn axis AX1 can be detected.

The holder 73 with the brush 72 attached can be slid in conjunction with a swing of a claw portion 401 provided to the second interlock member 40. With this structure, the claw portion 401 is caused to swing by a turn of the second interlock member 40 about the second turn axis AX2 and the swing causes the holder 73 to slide on the electrical-resistance sensor 71. The electrical resistance values change depending on positions of the brush 72 on the electrical-resistance sensor 71, and by using the electrical resistance values, the turn of the second interlock member 40 about the second turn axis AX2 can be detected.

A displacement detection section 80 is attached to the circuit board 90. The displacement detection section 80 includes, for example, a contact pattern 81 formed on the circuit board 90 and a contact sheet 82 disposed on the contact pattern 81. The displacement detection section 80 detects a displacement of the control member 20 in a direction different from both about the first turn axis AX1 and about the second turn axis AX2. In this embodiment, the displacement detection section 80 detects a displacement along the extending direction of the control member 20.

The first interlock member 30 has an arm portion 33 that extends from the side opposite to the side on which the first shaft support portion 31 is provided toward the upper side of the displacement detection section 80. For example, when the control member 20 is pushed (hereinafter, this pushing operation is also referred to as a "pushing operation") in a direction opposite to the direction control member 20 extends from the housing 10, the pivot is located on the first shaft support portion 31 side, and the pushing force causes the arm portion 33 of the first interlock member 30 to be pushed toward the displacement detection section 80 side. This displacement of the arm portion 33 pushes the contact sheet 82 to bring the contact sheet 82 and the contact pattern 81 to come into contact with each other, that is, the displacement detection section 80 is brought to a conducting state. Accordingly, the pushing operation on the control member 20 can be detected.

Second Urging Member

Figure 3:
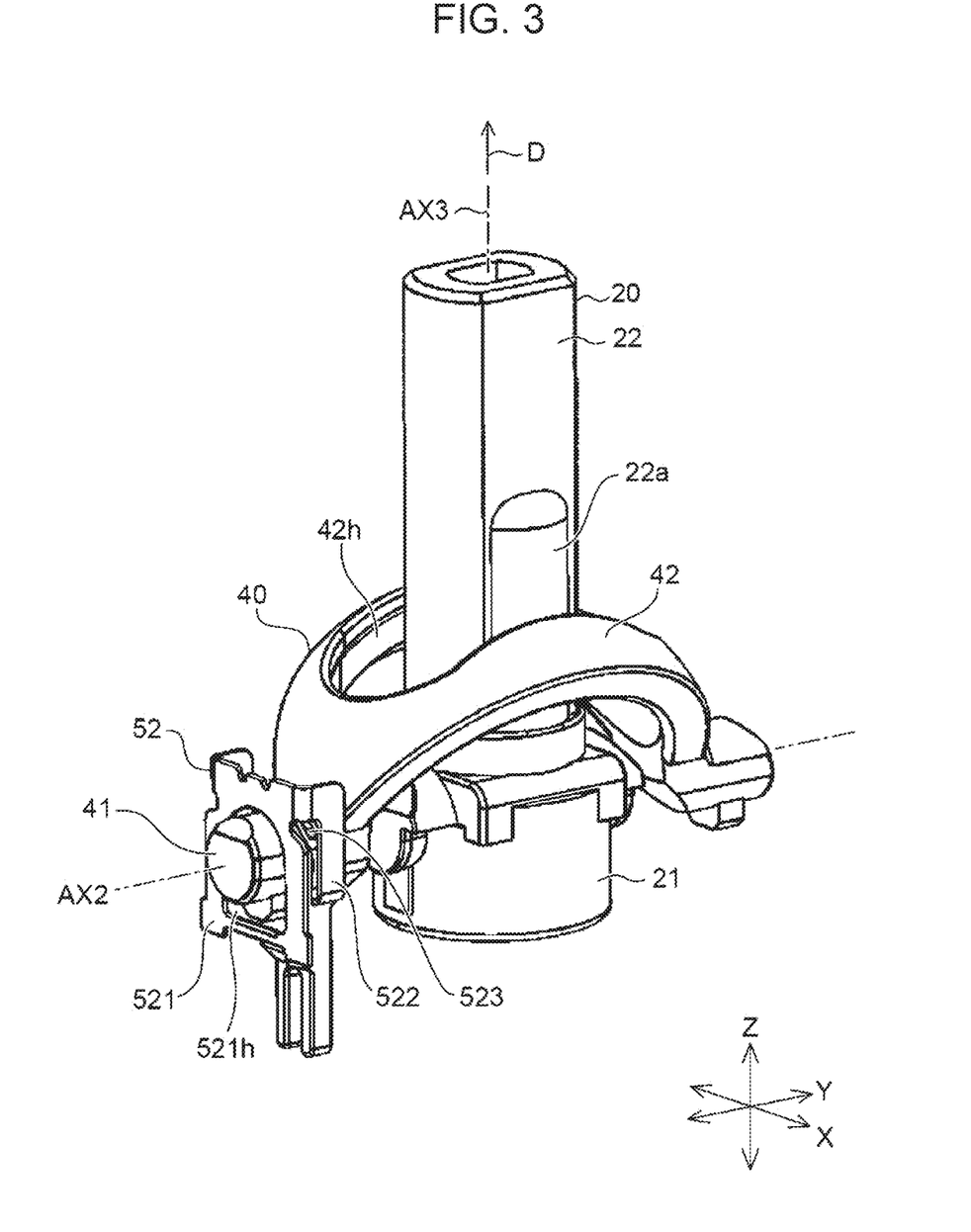
FIG. 3 is a perspective view illustrating an attached second urging member.
Figure 4A:
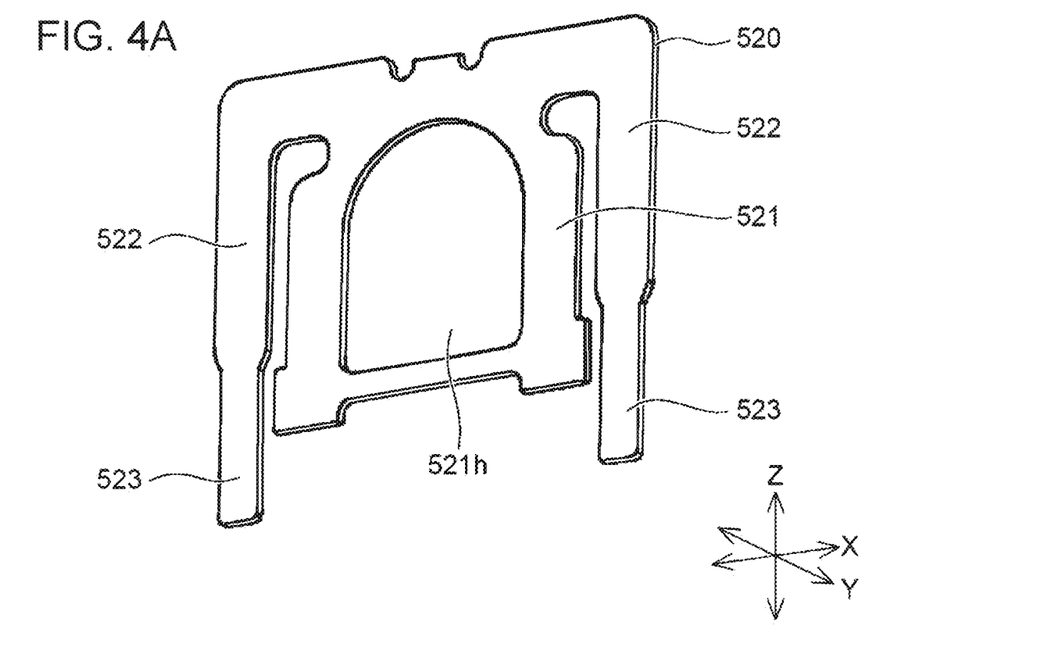
FIG. 4A is a perspective view illustrating an extended second urging member.
Figure 4B:
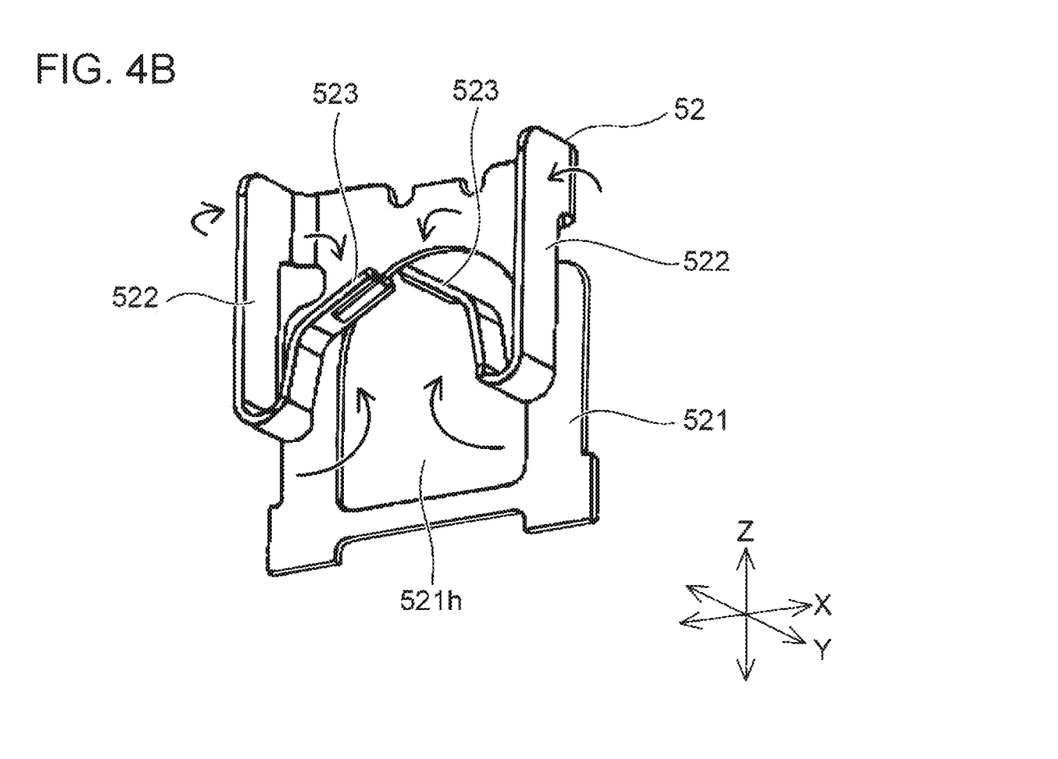
FIG. 4B is a perspective view illustrating a formed second urging member.

FIG. 3 is a perspective view illustrating an attached second urging member. FIG. 4A is a perspective view illustrating an extended second urging member. FIG. 4B is a perspective view illustrating a formed second urging member. The second urging member 52 includes a frame portion 521, a hole 521h provided at a center of the frame portion 521, bent pieces 522 provided at both sides of the frame portion 521, and tongue piece portions 523 that extend from the bent pieces 522. The second urging member 52 is accommodated in the housing 10 and an upper side of the second urging member 52 in the Z-axis direction is in contact with the housing 10.

When the second shaft support portion 41 is inserted into the hole 521h of the second urging member 52, the two tongue piece portions 523 come into contact with the second shaft support portion 41 to urge the second shaft support portion 41 toward the housing 10 side, more specifically, downward in the Z-axis direction. Here, since the extending portion 22 of the control member 20 is inserted through the hole 42h of the arch portion 42 of the second interlock member 40, the arch portion 42 and the extending portion 22 are not in a strong fitting state. Accordingly, the second interlock member 40 is not receiving a strong urging force applied to the control member 20 from the first urging member 51. In the second urging member 52 used in this embodiment, by using the spring properties of the two tongue piece portions 523, the second shaft support portion 41 is urged toward the housing 10 side (downward in the Z-axis direction) by the two tongue piece portions 523.

An intermediate component 520 of the second urging member 52 is formed by punching a metal plate as illustrated in FIG. 4A. The metal plate may contain, as an example, a copper alloy having spring properties such as corson copper alloy, phosphor bronze, and nickel silver, or a stainless steel material having spring properties. The intermediate component 520 has a shape the second urging member 52 is extended. By bending the intermediate component 520 as illustrated in FIG. 4B, the second urging member 52 is formed. The second urging member 52 having the portions formed by bending the punched plate enables increased productivity of the second urging member 52.

Figure 5:
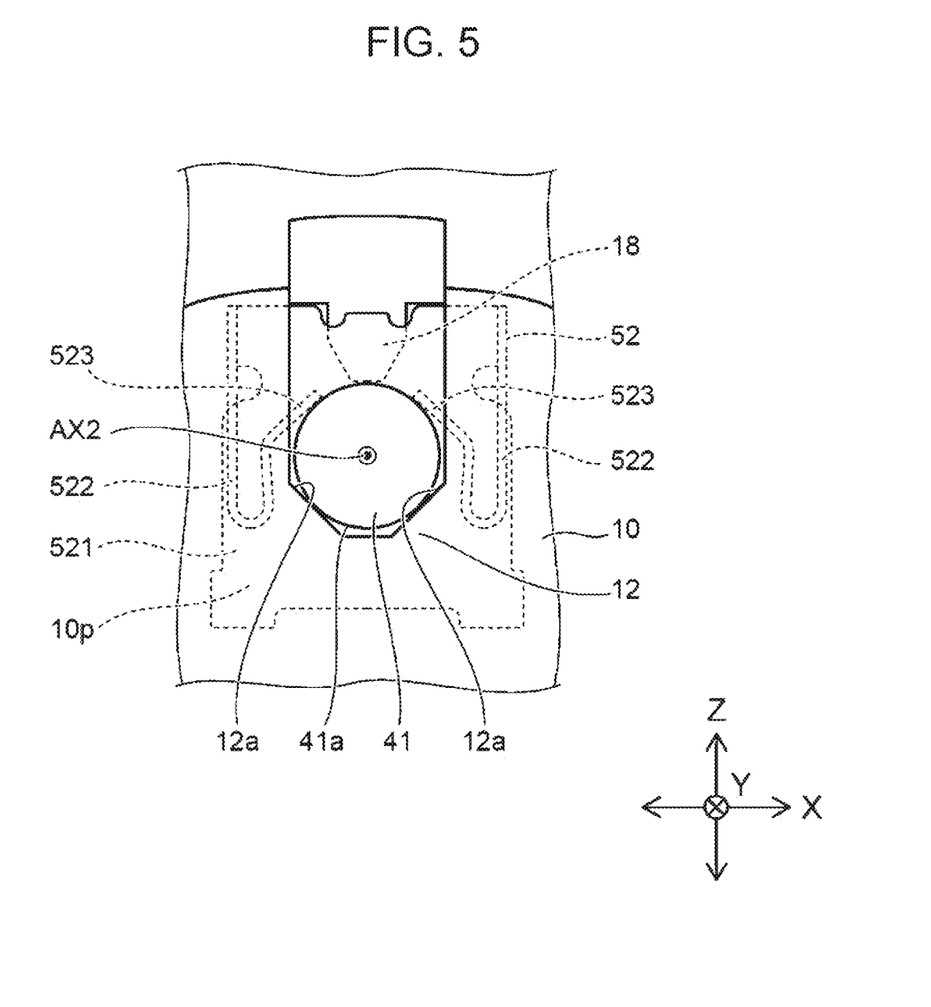
FIG. 5 is a plan view illustrating a second urging member in an urging state.
Figure 6:
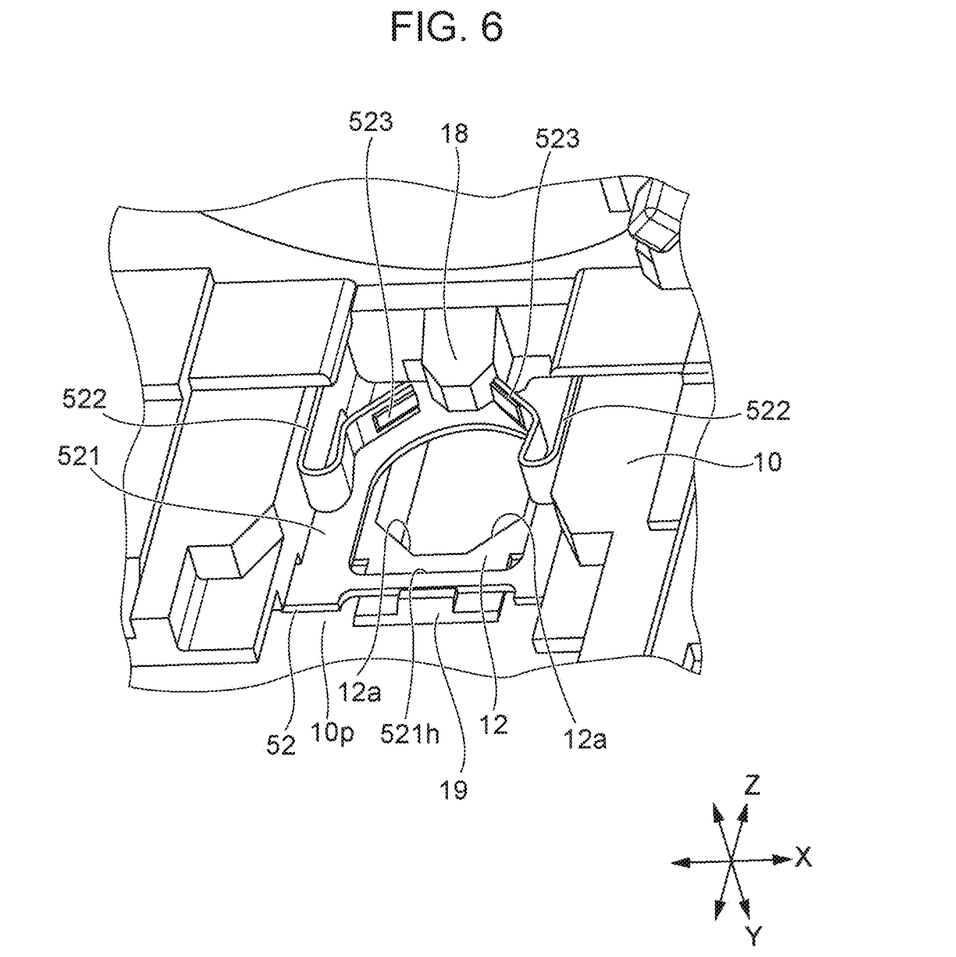
FIG. 6 is a perspective view illustrating a second urging member attached to a housing.

FIG. 5 is a plan view illustrating the second urging member in an urging state. FIG. 6 is a perspective view illustrating the second urging member attached to the housing. As illustrated in FIG. 5, the second urging member 52 is accommodated in an accommodation section 10p in the housing 10. An upper side of the second urging member 52 in the Z-axis direction located in the accommodation section 10p is in contact with the housing 10. With this structure, the two tongue piece portions 523 of the second urging member 52 urge the second shaft support portion 41 downward in the Z-axis direction to cause the second shaft support portion 41 to elastically press a shaft support contact portion 12 of the housing 10 located on the lower side of the second shaft support portion 41 in the Z-axis direction.

When viewed from a direction along the second turn axis AX2, an outer surface 41a of the second shaft support portion 41 has an arc portion at least on the lower side (the side facing the shaft support contact portion 12) in the Z-axis direction. The outer surface 41a of the second shaft support portion 41 illustrated in FIG. 5 has a circular shape. The shaft support contact portion 12 of the housing 10 that is a portion for receiving the second shaft support portion 41 has two inclined planes 12a that are not parallel to each other.

When the second shaft support portion 41 is urged by the second urging member 52, the arc-shaped outer surface 41a comes into contact with each of the two inclined planes 12a of the shaft support contact portion 12. With this structure, the two arc portions of the outer surface 41a of the second shaft support portion 41 and the shaft support contact portion 12 of the housing 10 are pressed, enabling smooth turn of the second shaft support portion 41 with respect to the housing 10. In addition, the second shaft support portion 41 is centered by the two inclined planes 12a of the shaft support contact portion 12, enabling the housing 10 to stably support the second shaft support portion 41. More specifically, when viewed in the Y-axis direction, the two inclined planes 12a are set such that a line connecting an intersection point obtained by extending two lines of the two inclined planes 12a and an intersection point between the second turn axis AX2 and the XZ plane is along the Z axis. With this structure, when the second shaft support portion 41 turns while being in contact with the shaft support contact portion 12, the shake of the second turn axis AX2 can be reduced.

The housing 10 includes a regulating member 18 on the upper side of the second shaft support portion 41 in the Z-axis direction. The regulating member 18 regulates displacement of the second shaft support portion 41. In other words, in the housing 10, the regulating member 18 is disposed on the side opposite to the side on which the shaft support contact portion 12 is provided with respect to the second shaft support portion 41. The regulating member 18 regulates the displacement of the second shaft support portion 41 in a direction having a component opposite to the urging direction (downward in the Z-axis direction) of the second urging member 52. With this structure, while the second urging member 52 is urging the second shaft support portion 41, the displacement of the second shaft support portion 41 in a direction (upward direction in the Z-axis direction) opposite to the urging direction (downward in the Z-axis direction) can be regulated, and the second shaft support portion 41 can be stably supported. Accordingly, even if a force exceeding the urging force applied by the second urging member 52 is applied to the second shaft support portion 41 in the opposite direction (upward in the Z-axis direction), the regulating member 18 can regulate the excessive separation of the second shaft support portion 41 from the shaft support contact portion 12.

FIG. 6 illustrates an inner portion (accommodation section 10p) of the housing 10 to which the second urging member 52 is attached. The second urging member 52 is attached to a position inside the housing 10 to surround the shaft support contact portion 12. A claw portion 19 is disposed on a lower side of the accommodation section 10p in the Z-axis direction. An end portion of the second urging member 52 is hooked to the claw portion 19 to fix the second urging member 52 inside the accommodation section 10p.

The second urging member 52 pushes the second shaft support portion 41 against the shaft support contact portion 12 of the housing 10, reducing a space between the second shaft support portion 41 and the shaft support contact portion 12 of the housing 10, which receives the second shaft support portion 41. Accordingly, an offset in the output of the second turn detection section 70 caused by the displacement of the rotation axis of the second shaft support portion 41 from the second turn axis AX2 defined by the housing 10 can be suppressed from occurring.

More specifically, when the second shaft support portion 41 moves (rises) away from the shaft support contact portion 12 upward in the Z-axis direction, the neutral axis AX3 of the control member 20 becomes not parallel to the Z axis. Accordingly, when the control member 20 returns to the neutral position, the second turn detection section 70 may inaccurately detect the center position (for example, a misalignment of the brush 72 with respect to the center position of the electrical-resistance sensor 71). In this embodiment, the second urging member 52 pushes the second shaft support portion 41 against the housing 10, reducing the lifting of the second shaft support portion 41 from the shaft support contact portion 12. Accordingly, the misalignment between the rotation axis of the second shaft support portion 41 and the second turn axis AX2 can be reduced, and the occurrence of inaccurate detection of the center position (detection error) by the second turn detection section 70 can be suppressed.

The misalignment between the rotation axis of the second shaft support portion 41 and the second turn axis AX2 may also cause an axis misalignment when the control member 20 returns to the neutral position. More specifically, when the second shaft support portion 41 moves (rises) away from the shaft support contact portion 12, the neutral axis AX3 of the control member 20 becomes not parallel to the Z axis. This may cause the misalignment of the control member 20 to the neutral position. The second urging member 52 presses the second shaft support portion 41 to reduce the misalignment between the rotation axis of the second shaft support portion 41 and the second turn axis AX2, suppressing the occurrence of the misalignment when the control member 20 returns to the neutral position.

Other Second Urging Members

Figure 7:
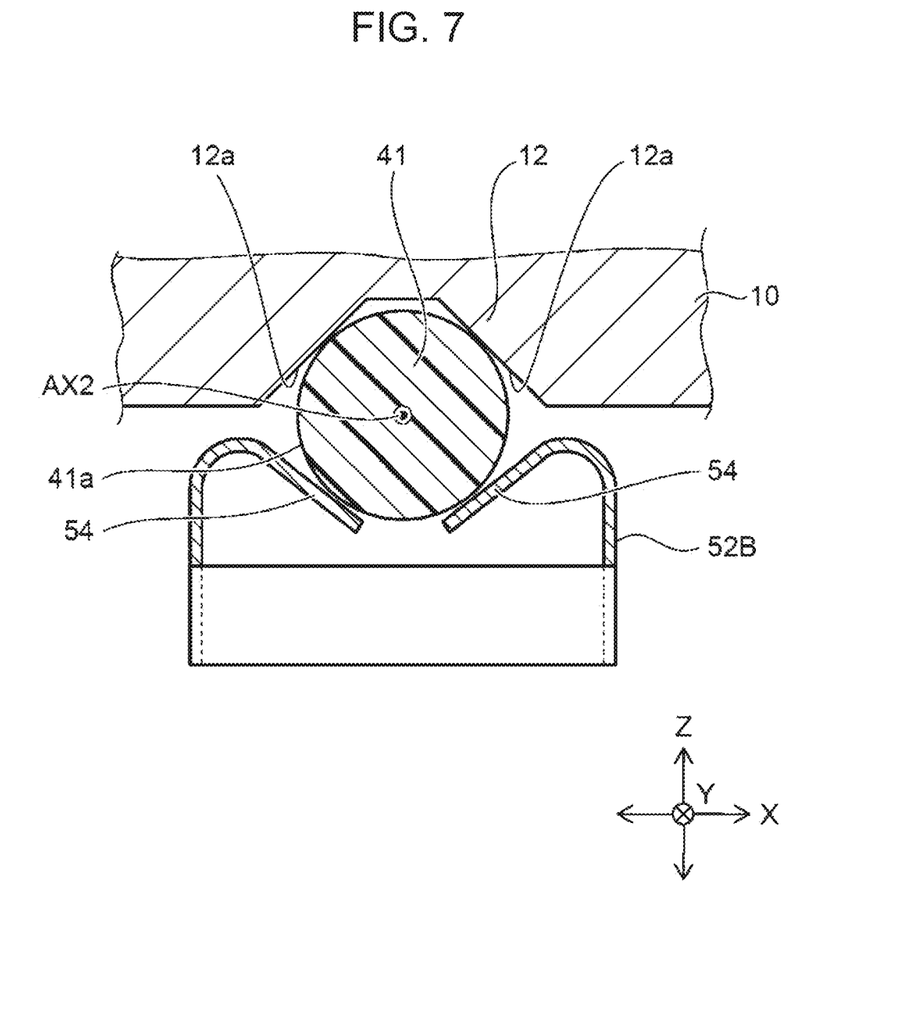
FIG. 7 is a schematic view illustrating another second urging member (first example)

FIG. 7 is a schematic view illustrating another second urging member (first example). A second urging member 52B illustrated in FIG. 7 is fixed to the housing 10 on the lower side of the second shaft support portion 41 in the Z-axis direction and has two tongue piece portions 54 that can be elastically deformed. The two tongue piece portions 54 of the second urging member 52B extend slantingly inward each other and face two inclined planes 12a of the shaft support contact portion 12 of the housing 10 respectively. The second shaft support portion 41 is held between the two tongue piece portions 54 of the second urging member 52, which is disposed on the lower side in the Z-axis direction, and the two inclined planes 12a of the shaft support contact portion 12, which is disposed on the upper side in the Z-axis direction. In this structure, the positional relationship between the two tongue piece portions 523 according to the first embodiment and the second shaft support portion 41 and the shaft support contact portion 12 is inverted. The second urging member 52B is in contact with the outer surface 41a of the second shaft support portion 41 at two portions and the shaft support contact portion 12 comes into contact with the outer surface 41a of the second shaft support portion 41 at two portions. The second urging member 52B is formed, for example, by bending an intermediate component made by punching a metal plate having spring properties.

Figure 8:
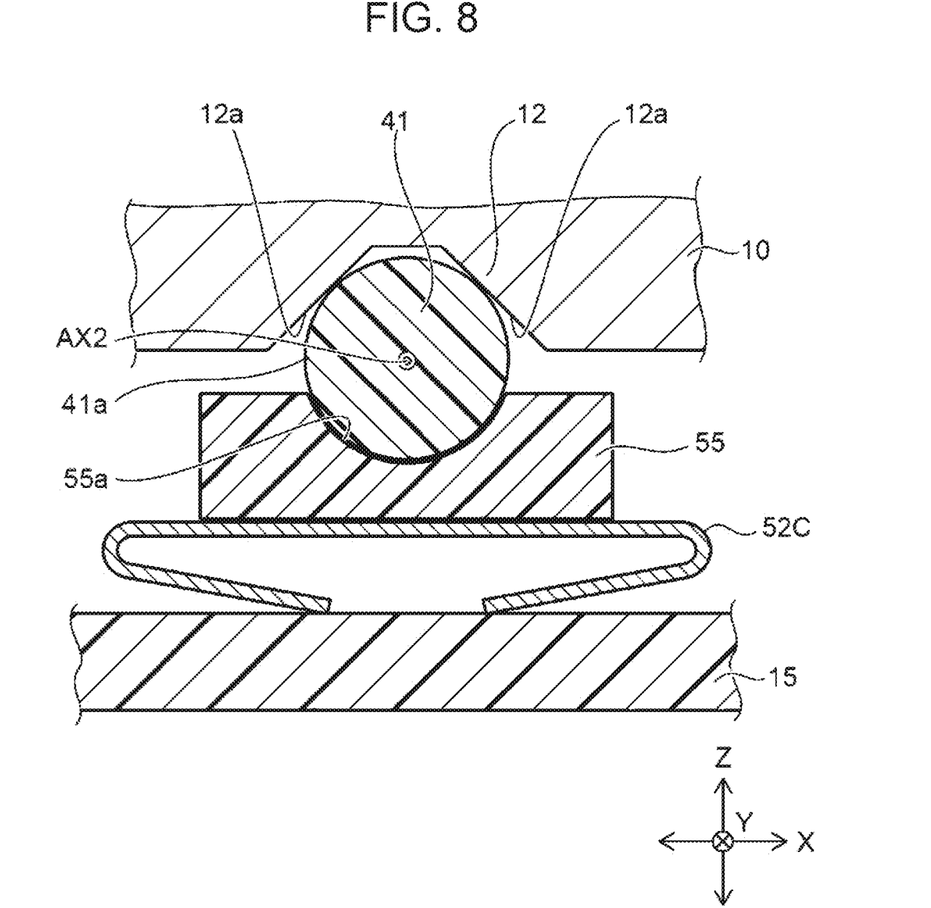
FIG. 8 is a schematic view illustrating still another second urging member (second example)

FIG. 8 is a schematic view illustrating still another second urging member (second example). A second urging member 52C illustrated in FIG. 8 is made by bending a plate-shaped member into a leaf spring-like shape and is held in an elastically deformable manner with respect to the housing 10 on the lower side of the second shaft support portion 41 in the Z-axis direction. An interposing member 55 is disposed between the second urging member 52C and the second shaft support portion 41.

The second urging member 52C is disposed between the interposing member 55 and the bottom plate member 15 to apply an urging force upward in the Z direction to the second shaft support portion 41 via the interposing member 55. The interposing member 55 has a recessed portion 55a. The recessed portion 55a has a shape of arc corresponding to an arc-shaped portion of the outer surface 41a of the second shaft support portion 41. The second shaft support portion 41 is disposed on the recessed portion 55a. With this structure, an urging force applied from the second urging member 52C is transmitted via the recessed portion 55a of the interposing member 55 to the second shaft support portion 41.

The recessed portion 55a and the outer surface 41a of the second shaft support portion 41 being in contact with each other prevents the urging force from the second urging member 52C from being locally applied to the second shaft support portion 41. In addition, when the recessed portion 55a of the interposing member 55 contains a material having a low coefficient of friction, such as fluoro plastic, the second shaft support portion 41 can be turned smoothly.

When compared with the above-described second urging member 52 and second urging member 52B, the second shaft support portion 41 is pushed at a plurality of portions of the above-described urging members, specifically, the two portions of the tongue piece portions 523, and the two portions of the tongue piece portions 54, whereas, in this structure, the second shaft support portion 41 is pushed by using the interposing member 55, which is a single member (at one portion). Accordingly, the second shaft support portion 41 is supported at three points (the two inclined planes 12a of the shaft support contact portion 12 and the interposing member 55), causing less displacement of the axis of the turning second shaft support portion 41.

Figure 9:
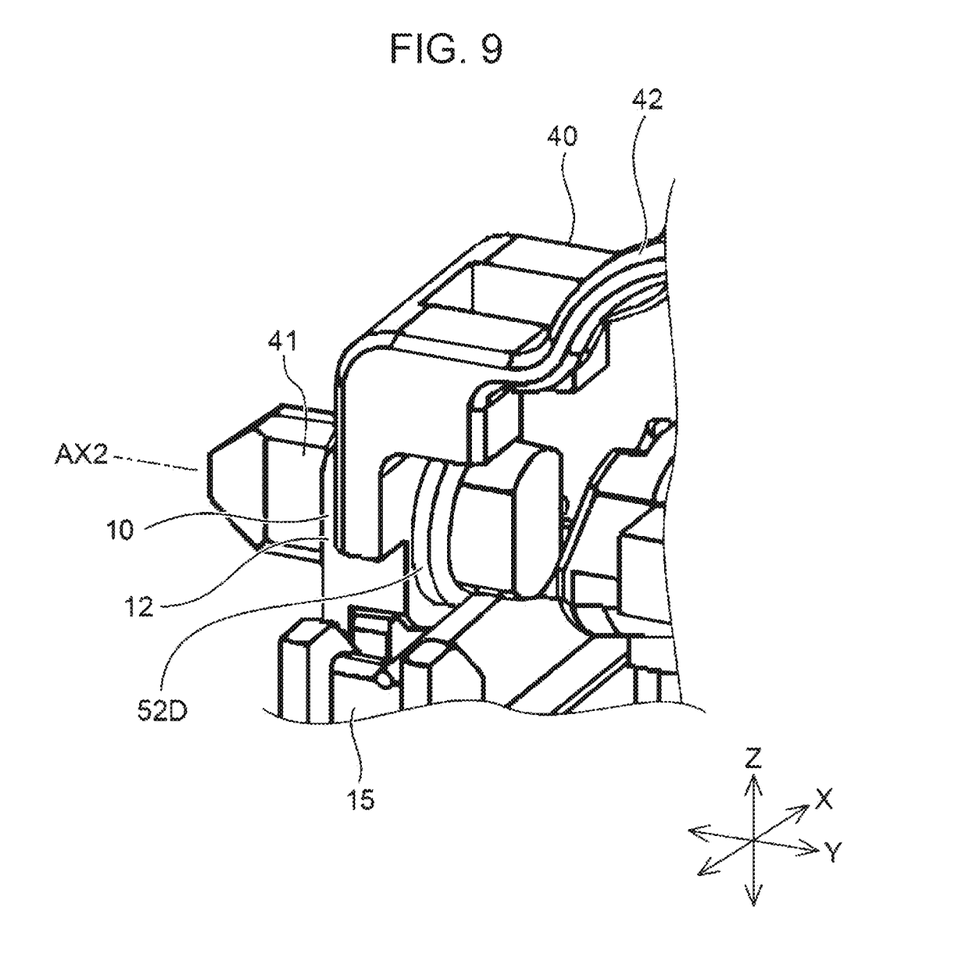
FIG. 9 is a perspective view illustrating still another second urging member (third example)

FIG. 9 is a perspective view illustrating still another second urging member (third example). A second urging member 52D illustrated in FIG. 9 has a portion of a torsion spring. The torsion spring is, for example, a coil spring. The portion of the torsion spring in the second urging member 52D urges the second shaft support portion 41 upward in the Z-axis direction toward the shaft support contact portion 12 of the housing 10. The second urging member 52D having the torsion spring portion may reduce the occupied space of the second urging member 52D.

Figure 10:
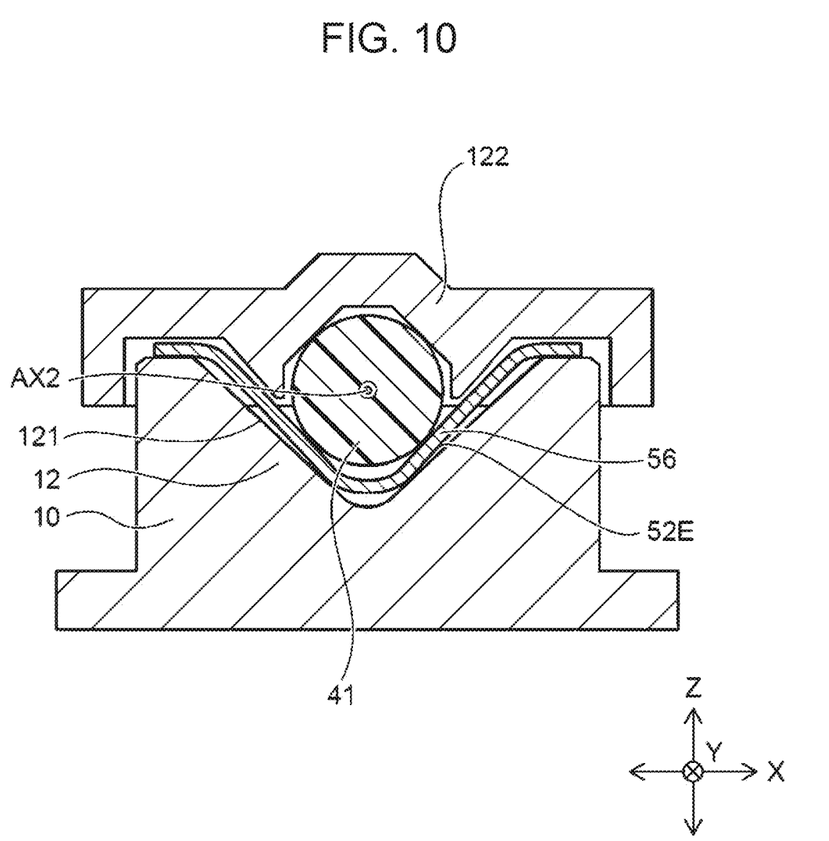
FIG. 10 is a schematic view illustrating yet another second urging member (fourth example)

FIG. 10 is a schematic view illustrating still another second urging member (fourth example). A second urging member 52E illustrated in FIG. 10 includes a V-shaped spring section 56 having a V shape when viewed from a direction along the second turn axis AX2 at a position on the lower side of the second shaft support portion 41 in the Z-axis direction. The housing 10 has a spring receiving portion 121 on the lower side of the second shaft support portion 41 in the Z-axis direction. The spring receiving portion 121 receives the V-shaped spring section 56 of the second urging member 52.

When viewed from a direction along the second turn axis AX2, the opening angle of the V-shaped spring section 56 is greater than the opening angle of the spring receiving portion 121. Accordingly, when the second shaft support portion 41 is disposed within the V-shaped portion of the V-shaped spring section 56 received by the spring receiving portion 121 and pushed downward in the Z direction, the V-shaped portion of the V-shaped spring section 56 opens, causing the V-shaped spring section 56 to produce an urging force upward in the Z direction.

The second shaft support portion 41 is disposed between the second urging member 52E having the V-shaped spring section 56 received by the spring receiving portion 121 and an upper pressing section 122. With this structure, the V-shaped spring section 56 supports the second shaft support portion 41 and also urges the second shaft support portion 41, thereby achieving space saving. In FIG. 10, the V-shaped spring section 56 is a leaf spring; however, it is not limited to this example and the V-shaped spring section 56 may be, for example, a torsion spring.

Figure 11:
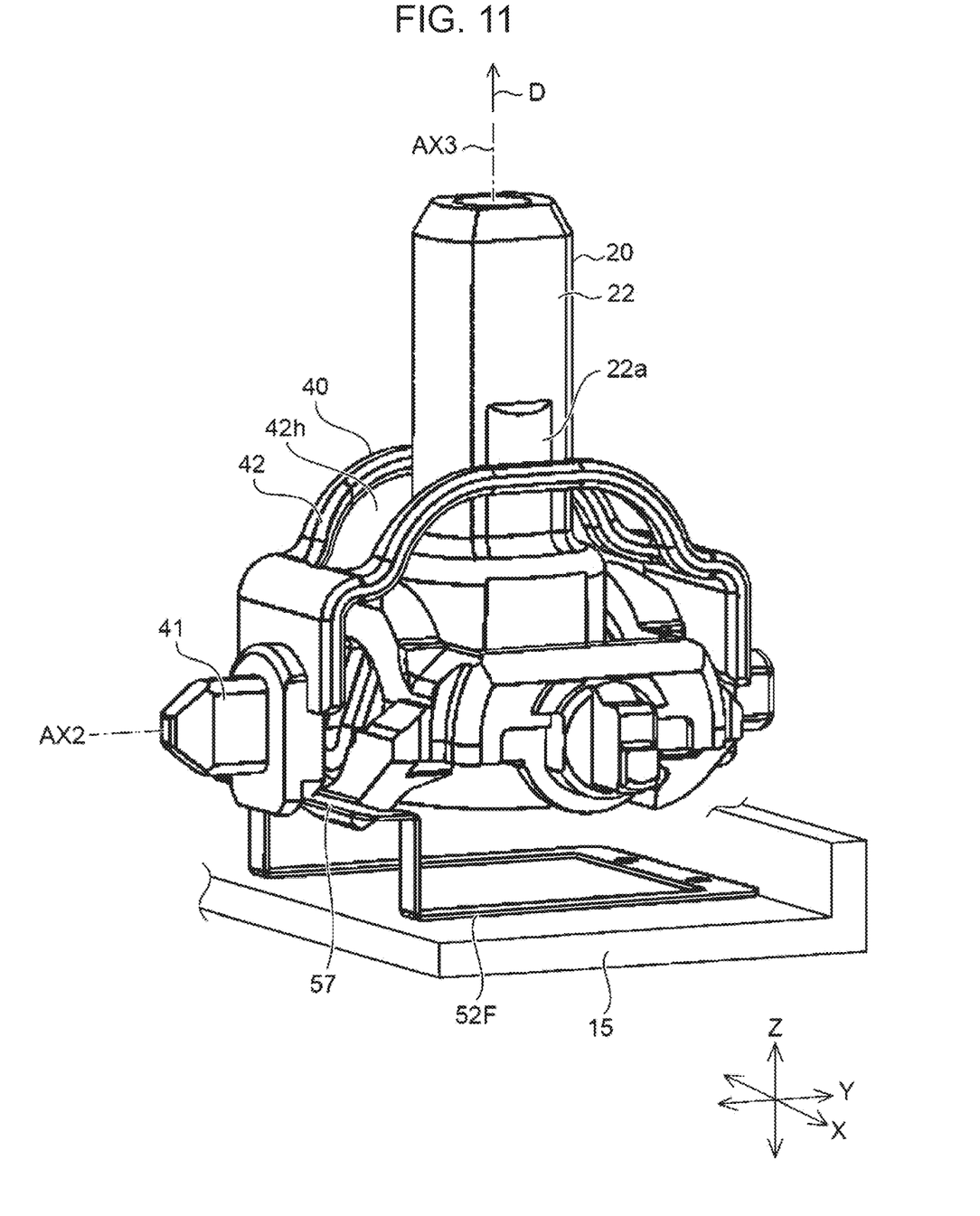
FIG. 11 is a perspective view illustrating yet another second urging member (fifth example).

FIG. 11 is a perspective view illustrating still another second urging member (fifth example). A second urging member 52F illustrated in FIG. 11 has a leaf spring portion 57. A part of the leaf spring portion 57 (right side in FIG. 11) is supported by the bottom plate member 15 and the other part (left side in FIG. 11) serves as a spring portion to urge a portion other than the second shaft support portion 41 of the second interlock member 40. In other words, the above-described second urging members 52 to 52E push the second shaft support portion 41, whereas the second urging member 52F pushes the portion other than the second shaft support portion 41 of the second interlock member 40 to indirectly push the second interlock member 40. This structure increases the degree of freedom of arrangement of the second urging member 52F.

As described above, the multi-directional input device 1 according to the embodiment reduces the space between the second shaft support portion 41 of the second interlock member 40 and the shaft support contact portion 12 of the housing 10, which receives the second shaft support portion 41, to increase the operability of the control member 20 and suppresses the occurrence of the misalignment when the control member 20 returns to the neutral position.

Although the embodiment has been described above, the present invention is not limited to this embodiment. For example, in the above description, the second urging members 52 to 52F urge the second shaft support portion 41 in the Z-axis direction; however, it is not limited to this example, and the second urging members 52 to 52F may urge the second shaft support portion 41 with a component in any of the XZ in-plane directions. That is, when viewed in the Y-axis direction, the shaft support contact portion 12 of the housing 10 may be located in any direction around the second shaft support portion 41. In addition, the first turn detection section 60 and the second turn detection section 70 may be of a type other than the electrical-resistance type (for example, a magnetic type), and the displacement detection section 80 may be of a type other than the contact type (for example, an optical-sensing type or a capacity-sensing type). The second urging member 52 may have a structure for urging the second shaft support portion 41 at three or more contact portions. It is to be understood that any component may be added, any of the above-described components may be omitted, or any of the above-described designs may be modified, or any the features of the structures according to the embodiment may be combined appropriately by a person skilled in the art without departing from the scope of the invention, and such modifications are included within the scope of the invention.

What is claimed is:

1. A multi-directional input device comprising:
    a housing;
    a control member configured to be tilted;
    a first interlock member having a first shaft support portion supported by the housing turnably about a first turn axis, the first interlock member being turned in conjunction with a tilting operation of the control member;
    a second interlock member having a second shaft support portion supported by the housing turnably about a second turn axis intersecting the first turn axis, the second interlock member being turned in conjunction with the tilting operation of the control member;
    a first urging member configured to urge the control member to push the first shaft support portion of the first interlock member against the housing and provide the control member with a return force for returning the control member to a neutral position;
    a second urging member configured to urge the second interlock member directly abut the second shaft support portion and push the second shaft support portion against the housing; and
    a turn detection section configured to detect a turn of each of the first interlock member and the second interlock member.

2. The multi-directional input device according to claim 1, wherein the second shaft support portion pushes a plurality of portions of the housing using the second urging member.

3. The multi-directional input device according to claim 2, wherein an outer surface of the second shaft support portion has an arc portion when viewed from a direction along the second turn axis and pushes the housing at two portions of the arc portion.

4. The multi-directional input device according to claim 1, wherein the second urging member urges the second shaft support portion in a direction along an extending direction of the control member at the neutral position.

5. The multi-directional input device according to claim 1, wherein the housing includes a regulating member configured to regulate displacement of the second shaft support portion in a direction having a component opposite to the urging direction of the second urging member.

6. The multi-directional input device according to claim 1, wherein the control member moves in a direction different from both about the first turn axis and about the second turn axis, and displacement of the control member is detected by a displacement detection section.

7. The multi-directional input device according to claim 1, further comprising:
    an interposing member disposed between the second shaft support portion and the second urging member, the interposing member being in contact with the second shaft support portion to transmit the urging force of the second urging member to the second shaft support portion.

8. The multi-directional input device according to claim 1, wherein the second urging member directly abuts the second shaft support portion at one portion and urges the second shaft support portion.

9. The multi-directional input device according to claim 1, wherein the second urging member directly abuts the second shaft support portion at a plurality of portions and urges the second shaft support portion.

10. The multi-directional input device according to claim 9, wherein the second urging member includes a V-shaped spring section having a V shape when viewed from a direction along the second turn axis, and the housing has a spring receiving portion configured to receive the V-shaped spring section.

11. The multi-directional input device according to claim 1, wherein the second urging member is supported by the housing and urges a portion other than the second shaft support portion of the second interlock member.

12. The multi-directional input device according to claim 1, wherein the second urging member has elastically deformable tongue piece portions and the tongue piece portions urge the second shaft support portion.

13. The multi-directional input device according to claim 1, wherein the second urging member has portions formed by bending a punched plate.

14. The multi-directional input device according to claim 1, wherein the second urging member has a torsion spring portion, and the torsion spring portion urges the second shaft support portion.

* * * * *